United States Patent [19]
Franke et al.

[11] Patent Number: 4,710,763
[45] Date of Patent: Dec. 1, 1987

[54] METHOD FOR GENERATING AND DISPLAYING TREE STRUCTURES IN A LIMITED DISPLAY AREA

[75] Inventors: David W. Franke; Carroll R. Hall, both of Austin, Tex.

[73] Assignee: Texas Instruments Incorporated

[21] Appl. No.: 663,005

[22] Filed: Oct. 19, 1984

[51] Int. Cl.$^4$ .............................................. G09G 1/14
[52] U.S. Cl. .................... 340/723; 340/731; 340/747; 364/518
[58] Field of Search .................. 340/723, 286 M, 525, 340/731, 747, 717, 724, 709, 720, 721; 364/518

[56] References Cited

U.S. PATENT DOCUMENTS

| | | | |
|---|---|---|---|
| 3,522,597 | 8/1970 | Murphy | 340/722 |
| 3,757,037 | 9/1973 | Bialek | 340/723 |
| 4,085,443 | 4/1978 | Dubois et al. | 340/711 |
| 4,317,956 | 3/1982 | Torck et al. | 340/709 |
| 4,323,891 | 4/1982 | Akashi | 340/709 |
| 4,366,475 | 12/1982 | Kishi et al. | 340/731 |
| 4,392,130 | 7/1983 | Lundström et al. | 340/747 |
| 4,418,345 | 11/1983 | Demke et al. | 340/731 |
| 4,451,900 | 5/1984 | Mayer et al. | 364/900 |
| 4,546,349 | 10/1985 | Prohofsky et al. | 340/731 |
| 4,613,946 | 9/1986 | Forman | 340/720 |

OTHER PUBLICATIONS

Doctor et al., Display Techniques for Octree-Encoded Objects, Jul. 1981, IEEE Computer Graphics and Applications, vol. 1, No. 3, 81, pp. 29–38.

Meagher, "Geometric Modeling Using Octree Encoding", Computer Graphics and Image Processing, vol. 19, 1982, pp. 129–147.

Yamaguchi, "Octree Related Data Structures and Algorithms", IEEE Computer Graphics and Applications, vol. 4, No. 1, Jan. 1984, pp. 53–59.

Primary Examiner—Gerald L. Brigance
Attorney, Agent, or Firm—Thomas G. Devine; James T. Comfort; Melvin Sharp

[57] ABSTRACT

There is disclosed a method for constructing and displaying tree structures with automated data processing equipment. A focused view of a portion of the tree is provided to enable an operator to perform editing and evaluating functions on the tree. The focused view presents a view of this portion of the tree structure with a geometry different than what would be used if the entire structure were to be portrayed. This provides a view with sufficient resolution to be highly readable. In the preferred embodiment, the focused view is comprised of a focus node of the tree, its parent node along with the branch connecting the parent node and the focus node, the sibling branches of the connecting branch, all successor nodes of the focus node, and the branches connecting the successor nodes to the focus node.

22 Claims, 22 Drawing Figures

METHOD FOR GENERATING AND DISPLAYING TREE STRUCTURES IN A LIMITED DISPLAY AREA

BACKGROUND OF THE INVENTION

1. Field of the Invention

This invention relates to the interactive generation and display of information, and more specifically to the interactive generation and display of tree structures.

2. Description of the Related Art

In recent times much effort has been devoted to the development and refinement of techniques for making decisions in complex environments. The arenas in which such decisions must be made are extremely diverse and can include the choice from a wide variety of options of personal investment vehicles, or the corporate selection of the optimum course of action in terms of the allocation of corporate resources. One mechanism which has found wide acceptance in the formulation of such decisions is the so called "decision tree".

Briefly, decision trees typically include a variety of nodes which take one of three forms. A node may be a decision node representing the need to make a choice between two or more possible courses of action. Alternatively, a node may be a chance node indicative of a point in the tree where one of two or more events will occur, but where the information about which event will actually occur is available only in terms of a probability. Finally a node may be an end node which represents the final point in a possible chain of decisions and random events.

The various nodes are connected by tree branches. Branches originating at a decision node each represent the selection of one of the several courses of action that are possible at the node. In many cases a particular choice will have a predictable economic effect. If the decision to be made for example is whether to add plant capacity or to add a third shift of factory workers, both the cost of expansion and the cost of adding employees can be predicted. It is common in tree structures to associate these costs with the particular branch to which they correspond.

Similarly, branches originating at chance nodes each represent one of the possible events that can occur at the node. In this case the probabilities that the decision maker thinks are appropriate for each of these events are associated with the corresponding branches.

Finally, each end node will have an associated economic effect. In the case of a profit maximization analysis, for example, this will represent the profit that is to be expected for a particular sequence of decisions and events that correspond to the path through the tree leading to the particular end node in question. Once the tree has been created, various statistical techniques can be used to evaluate the economic effects and the probabilities of the various paths through the tree and to select the optimum path from a statistical point of view. The value of the tree lies in the fact that it provides an ordered framework for assessing the impact on the final result of varying one or more of the a priori assumptions as to the probabilities at a chance node, or the a priori estimates of the various economic parameters.

More recently there have been attempts to provide a decision tree capability on various types of automatic data processing equipment. The computational capability of the machines coupled with convenient display capability, such as by means of a cathode ray tube (CRT), can result in a flexible means for decision tree analysis. One problem in this regard, however, stems from the size of most practical decision tree structures. If the tree is to be displayed on paper this does not create major problems. If the tree, however, is to be displayed on the limited dimensions of a CRT, a tradeoff must be made between the desire to display the entire tree to provide perspective, and the need to display local parts of the tree with sufficient size to be readily interpretable by the operator. In the past, attempts have been made to resolve this problem by displaying a magnified version of a local portion of the tree. An example of this is the Harvard Project Manager which is available from Harvard Software Inc., 521 Great Road, Littleton Road, Mass. This approach may not always provide a desirable result since decision trees tend to be expanding structures with a very thin branch density near the base of the tree and a dense branch structure at the top or end. Accordingly, a display magnification which is appropriate for one portion of the tree may not provide sufficient information at other portions of the tree. This same difficulty may be encountered in other tree structures such as PERT charts and knowledge representations in the case of expert systems.

SUMMARY OF THE INVENTION

By means of this invention there is provided an improved method and system for creating and analyzing tree structures which is particularly well adapted for use in connection with automatic data processing equipment. In the preferred embodiment, the tree structure is displayed by means of a CRT associated with the data processing equipment. As the tree is created, portions are displayed to the operator on the CRT. Again, in the preferred embodiment the portion which is displayed includes the node which is the center of interest for the moment (hereinafter referred to as the "focus" node). The display also shows the branch leading to the focus node along with the origin node for that branch, the other branches originating at that origin node, and the output branches originating at the focus node along with their termination node. By this means the operator is provided with a local display having sufficient information to allow him to relate the focus node to its surroundings in the decision tree. Most importantly, the format of this effective display is provided irrespective of the location of the focus node in the decision tree.

To further assist in relating the focus node to the remainder of the tree structure, the preferred embodiment provides the option of displaying a scaled down portion of the entire tree in a small part of the screen that is reserved for that purpose. In the case where a color display is available, the location of the focus node in the display of the entire tree is indicated by a distinctive color. In the case of a monochrome display this location is indicated by a distinctive shading. In the event that the entire tree is too large to fit within the bounds of the small part of the screen reserved for it, the portion centered around the focus node is displayed. This reduced size view of the entire tree or substantial portion thereof will be referred to as the "macro view".

It is therefore an object of the invention to provide a method of displaying a portion of a tree structure wherein the portion is focused or geometrically scaled in a manner different than would be the case if the entire tree were to be displayed.

It is another object of the invention to provide a method of displaying a portion of a tree structure wherein said portion consists of a focus node, its parent node and the incident branch connecting these two nodes along with the siblings of this incident branch, and the successor nodes of the focus node along with the branches connecting the focus node to the successor nodes.

It is yet a further object of the invention to provide a method of creating and displaying a tree structure wherein an operator is prompted to define the set of nodes and branches making up the tree structure, and wherein a portion of the tree structure is displayed with a geometry different than that which would be used if the entire tree were to be displayed.

Other objects and advantages of the present invention will be apparent from the following detailed specification, when read in conjunction with the accompanying drawings which illustrate the preferred embodiment of the invention.

BRIEF DESCRIPTION OF THE DRAWINGS

FIGS. 11a-11d comprise a flow chart for the cursor movement function.

DETAILED DESCRIPTION

Figure 1:
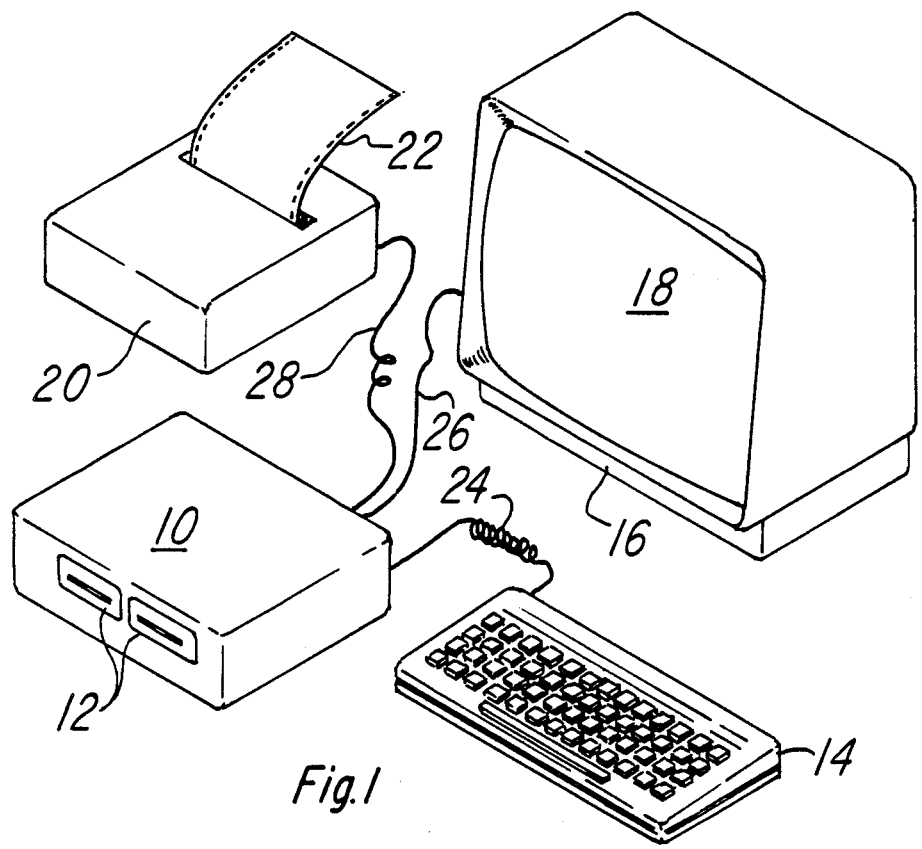
FIG. 1 is a perspective view of a personal computer system.
Figure 1A:
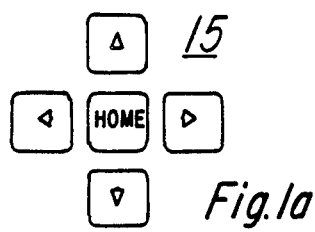
FIG. 1a shows the cursor key arrangement of a personal computer.

One system that adapts well to implementation of the invention is the personal computer system illustrated in FIG. 1. Typically, such systems include a central processing unit (CPU) 10 which contains the arithmetic processor and certain of the memory units of the system. The CPU may include one or more disk drives 12 which accept floppy disks as a medium for providing bulk data and instructions to and from the CPU. A real time display of information generated by CPU 10 is provided by means of display unit 16 which communicates with the CPU by means of cable 26. Display unit 16 typically uses a cathode ray tube (CRT) 18 as the display medium. Operator control of the CPU operation is effected by means of a keyboard unit 14 which communicates with the CPU by means of cable 24. As is well known, keyboard unit 14 typically includes a typewriter style alphanumeric keypad as well as a variety of control keys. As illustrated in FIG. 1a, the control keys include a set of cursor control keys by means of which the cursor of CRT 18 can be caused to move in any of four directions. As is well known in the art, movement of the cursor could alternatively be effected by means of a hand driven "mouse". Finally a printer unit 20 provides a hard copy 22 of certain results, usually at the option of the operator. Printer unit 22, which communicates with CPU 10 by means of cable 28, may use any of various types of printheads including daisy wheel, wire matrix, inkjet, and thermal.

In the preferred embodiment of the invention, control is provided by instructions stored on one or more floppy disks as read by disk drives 12. Of course, alternative memory mechanisms are available, a common one being the so called Winchester disk. An operator interacts with the system via keyboard unit 14 to build and evaluate the decision tree. The tree, as it is being constructed or evaluated, is displayed by means of the CRT 18.

In this way there is provided a method for interaction with the decision tree, creating and modifying the tree structure graphically on the CRT. A large percentage of the input is done by "pointing" at the desired location in the decision tree or in a function menu. As will further be described below this pointing is accomplished via the cursor keys.

Figure 2:
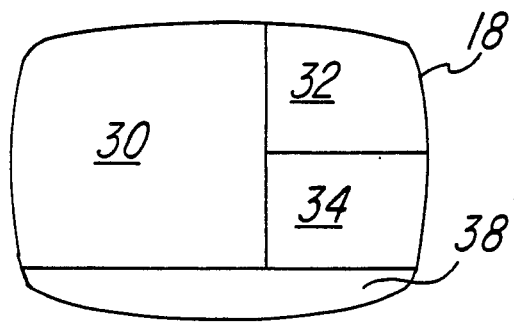
FIG. 2 illustrates the windows making up the display screen of a cathode ray tube display.

As shown in FIG. 2, the CRT display is comprised of four windows. When input is required from the user to proceed, the corresponding window contains text (usually one word) in reverse video. This might be a menu item, an operation indicator like SELECT or ACTIVE, or a message indicator like NOTE. The graphical display window 30 is a large window on the left hand side of the CRT. A "focused" view of the decision tree is displayed in this window. The word "focused" is used because the geometry of the portion of the tree displayed in this window is modified from that which would be used if the entire tree were to be displayed. In the preferred embodiment, only a fixed context of the decision tree structure is displayed at any instant in time. Three levels of decision tree nodes and the included branches are displayed, annotated with descriptions, values, and probabilities (where appropriate).

The function display window 32 in the upper right hand corner of the CRT can be used for several functions, one of these being a macro display of the entire tree, or as large a portion thereof as can be displayed within the limited confines of the window area.

The function menu window 34 in the lower right hand side of the CRT is used to enable the operator to select one of a plurality of functions. Menus of available functions are displayed here. Some functions require the user to make additional selections or to input data from the keyboard. These selections and input are also done in this window.

Finally, the narrow message window 38 stretching across the bottom of the CRT provides two functions. First, expanded explanations for functions currently selected by pointing in the function menu are given here. Secondly, functions which perform calculations display an appropriate message here during the computation.

The current or active decision tree is displayed in the graphical display window 30. The nodes of the tree are displayed in symbolic fashion with nodes representing a decision being shown as shaded squares, chance points as shaded circles, and end points with no symbol. An open circle superimposed on an open square indicates that a branch has been added to the tree, but the corresponding node type has not yet been defined. Alternative or outcome descriptions, probabilities, and values are displayed along the branches. The method of constructing a decision tree will now be described.

METHOD OF OPERATION

When the process is initiated, the first of several menus is displayed in function menu window 34. The options available in this File Menu are listed in Table 1.

TABLE I

File Menu

| | |
|---|---|
| Load Tree | Delete File |
| Save Tree | Save Subtree |
| Edit Menu | Eval Menu |
| Exit | |

In the display, the function to be selected is highlighted by being shown in the reverse video mode. The operator uses the cursor keys to "point" at the desired function, that is to cause the desired function to be so highlighted. As will be the case throughout this description, the choice is entered by depression of the return key.

If there are any existing tree structures stored in disk memory, the load tree function causes the names of these trees to be displayed in function display window 32. The operator then points at the desired tree name and enters his selection. The initial portion of the selected tree is then displayed in graphical display window 30. At this point the operator may select either the edit menu function if he wishes to alter the existing tree, or the eval menu function if he wishes to evaluate the existing tree. Alternatively, if he wishes to construct a new tree, he will immediately select the edit menu function. Table 2 shows the functions available in the Edit Menu which appears in window 34 at this point. It will be noted that certain "functions" such as file menu, edit menu, and eval menu which appear in the menus are actually calls to another menu.

TABLE 2

Edit Menu

| | |
|---|---|
| New Tree | Edit Values |
| Define Node | Macro View |
| Add Branch | Exit |
| Add Subtree | Eval Menu |
| Copy Subtree | File Menu |
| Delete Subtree | |

Figure 3A:
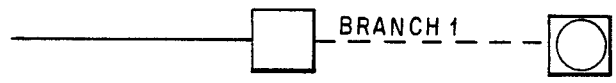
FIGS. 3a-3f illustrate various stages in the construction of a decision tree.

Creation of the new tree is initiated by selection of the new tree function which causes an open circle superimposed by an open square with an incident branch to appear in the middle of window 30. Selection of the define node function prompts the operator to define the node as a decision, chance, or end node. If he selects decision node, he is prompted to name the branch that departs from the node. He then returns to the edit menu by selecting an "exit menu" function. At this point the display will be as shown in FIG. 3a (it is assumed that the name given to this branch was "BRANCH 1"). In the display a branch and/or node is designated as active by virtue of having a unique color if a color monitor is used or by intensity modulation in the case of a monochrome display. In FIG. 3, active nodes will be shown as solid squares or circles as opposed to cross hatching for the other nodes. Similarly, active branches will be shown as solid lines in contrast to dashed lines for the other branches.

Figure 3B:
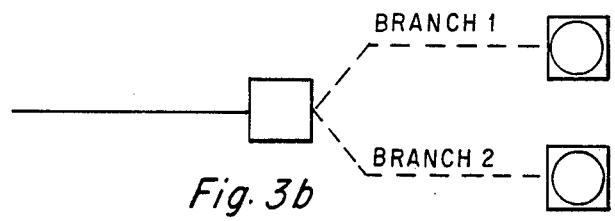

Generally at this point the operator will wish to add at least one more branch emanating from the initial decision node. This is accomplished by entering the add branch function. At this point, and whenever an add branch function or define node function is entered, the word SELECT flashes at the lower right hand corner of graphical display window 30 requesting the operator to point to the branch or node to be processed. In the case of an add branch function, the cursor keys are used to highlight the node from which the new branch is to emanate and this choice is entered. In the case of the define node function, the cursor is used to highlight the node to be defined and the choice is entered. Upon choosing the initial decision node in the add branch mode, an additional branch terminating in an undefined node and emanating from the decision node appears on the display. As before, the operator is prompted to name the branch and returns to the edit menu via the exit menu function. At this point the display appears as shown in FIG. 3b. Throughout this description, the names BRANCH 1, CHANCE 2. etc. are selected arbitrarily, and would normally be replaced by names having relevance to the particular situation being modelled.

Figure 3C:
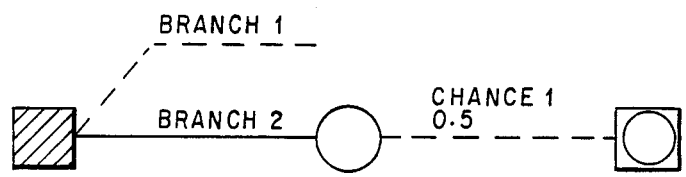

Next the operator may wish to define the nature of the nodes located at the ends of the two branches. This is accomplished through use of the define node function. Assume for the purposes of this description that after choosing either of the paths represented by the two branches, a chance event will occur. By that is meant an event having two or more outcomes which can only be predicted in a probabilistic sense. The operator selects a node at the end of one of the branches with the cursor keys and is then prompted to enter his choice of decision, chance, or end node. Upon choosing chance, the node becomes a filled circle and a new branch, emanating from this chance node and terminating in a new undefined node appears in the display. The new branch represents a possible outcome of the chance event. The operator is prompted to assign a descriptive name to the outcome and then to enter his estimate of the probability that the outcome will occur. After returning to the edit menu via the exit menu function, the display appears as shown in FIG. 3c. Here it is seen that the estimate of the probability that the outcome CHANCE 1 will occur is 0.5.

Figure 3D:
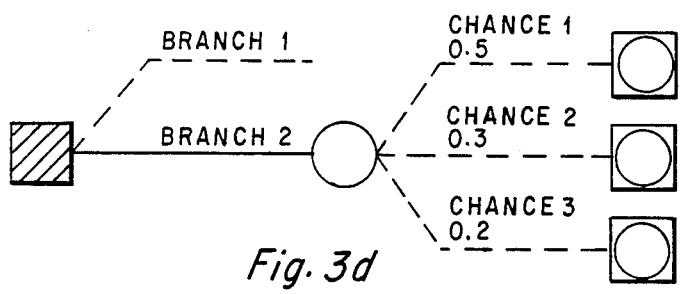

The add branch function is used at this point to add two more branches, each representative of an additional possible outcome of the change event. In each case, since the new branch emanates from a chance node as opposed to a decision node, the operator is prompted to enter both a descriptive name and a probability of occurrence. At the conclusion of this process, the display appears as shown in FIG. 3d.

Figure 3E:
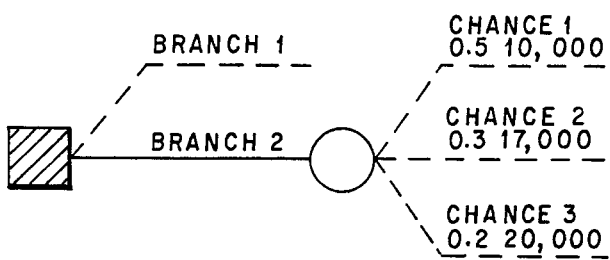

At this point, the tree includes three undefined nodes. The define node function is entered and the cursor keys used to select the node at the termination of the CHANCE 1 branch. This node represents the end of one particular path through the tree. While practical trees are normally much more complex than the illustration shown here, and any path through a tree would normally include a large number of branches located end to end, the simple case shown here with just two branches is sufficient to illustrate the principles of the invention. In this example, the operator would identify the selected node as an end node. Since this node is an end node, the node marker is removed from the display, and the operator is prompted to enter a value. This value represents the economic consequence of following the particular path through the tree leading to the end node in question. For example, if the decision represented by the BRANCH 2 branch is elected and the outcome at the chance node should turn out to be that represented by the CHANCE 1 branch, then the profit to the decision maker might be $10,000. If such is the case, the operator would enter 10,000 as the value for the end node at the conclusion of this path. Upon return to the edit menu via the exit menu function, the value 10,000 appears beside the 0.5 probability of the CHANCE 1 branch. The operator would then use the define node function to define the remaining two undefined nodes as end nodes, each with its estimated value. At the conclusion of these steps the display appears as seen in FIG. 3e. While the values in this example have been shown as profit values, it may be more appropriate in some cases to use cost as an alternative.

Figure 3F:
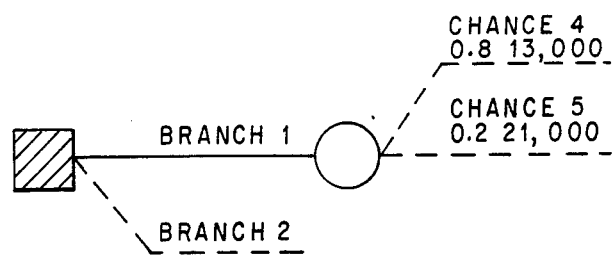

The procedures described above may be used to add tree structure to the end of BRANCH 1 with a possible resultant structure such as represented in FIG. 3f. When this is done, all paths of the tree terminate in end nodes and the structure is complete.

FIG. 3f may be used to illustrate the general nature of the display which is provided in graphical display window 30. The node appearing in the center of the display will be referred to as the focus node. The display includes all branches emanating from the focus node and the nodes at the ends of these branches, it being understood that end nodes are not expressly shown. The branches comprising the set of all branches emanating from a node will be referred to as siblings of each other. The display also includes the branch leading to the focus node, its origin node, and its siblings. As the focus node is varied by means of an operator using the cursor keys, this same general display format is used irrespective of where in the tree the focus node happens to be located. The display shown in graphical display window 30 is the preferred embodiment of a focused display.

Figure 4:
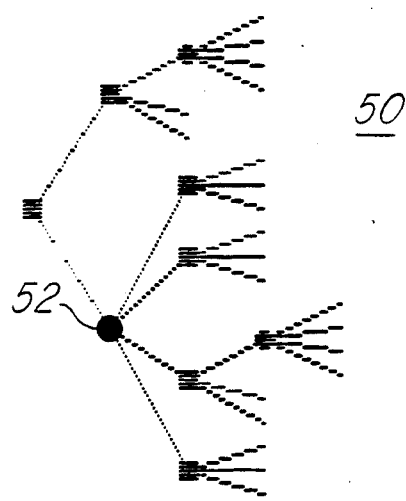
FIG. 4 shows a macro view of a decision tree.

At any time during the construction of a tree, the macro view function may be used to invoke a miniaturized view of the entire tree structure in function display window 32. One such macro view 50 is shown in FIG. 4. In the macro view, the current focus node is highlighted so as to facilitate relating the focused display to the entire tree as shown in the macro view. In this way, while the focused view provides a picture of only a portion of the entire tree, it can be viewed in context by comparison with the macro view. In some cases, the tree may be so large that the entire tree cannot be shown within the confines of function display window 32. In such an instance, the macro view shows as large a portion of the tree as the display area permits centered around the focus node of the focused display.

Figure 5:
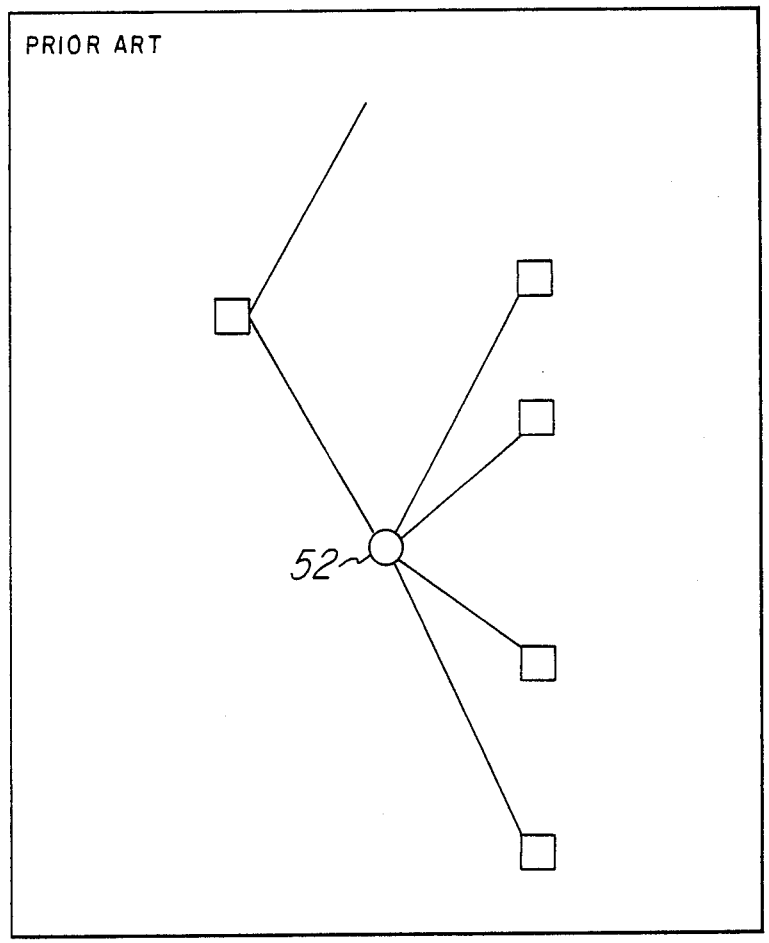
FIG. 5 shows a prior art display.
Figure 6:
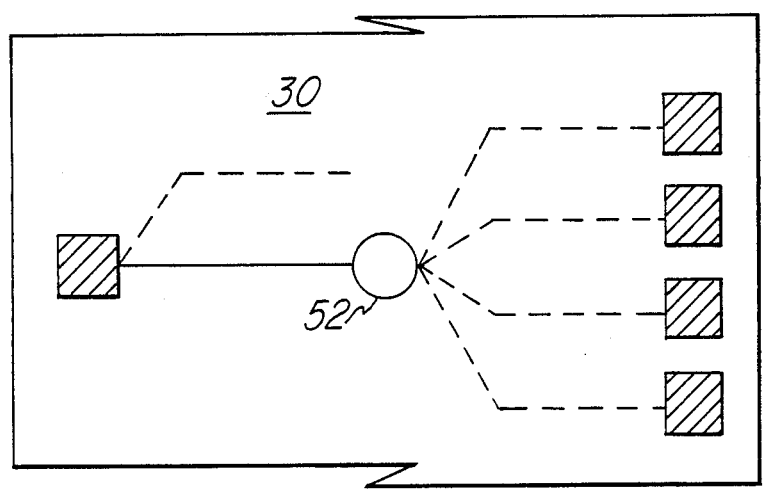
FIG. 6 shows a display in accordance with the principles of the present invention.

The tree structure shown in FIG. 4 may be used to illustrate an advantage of the present invention. In the prior art, if it was desired to view a larger version of a portion of a complete tree structure, the practice was simply to magnify that portion without modification and to display it. Thus FIG. 5 illustrates this prior art technique, showing a magnified version of the portion of the tree structure centered about focus node 52 of FIG. 4. The size of FIG. 5 has been selected to approximate the area available in graphical display window 30 on a typical CRT. Only those nodes and branches that are included in the focused display centered around focus node 52 in accordance with the principles of this invention are included in the display of FIG. 5. In contrast, FIG. 6 shows the same portion of the complete tree in a portion of graphical display window 30 as it appears in the focused display of the present invention. As a result of "focusing" or varying the geometry of the tree portion to be shown in graphical display window 30, there is provided a display having better resolution than that available in accordance with prior art methods. As the total tree structure becomes larger, as is the case in most practical decision tree structures, the difference becomes even more noticeable, and the point is rapidly reached where any magnification in accordance the prior art methods becomes impossible because of the size limitations of the display area.

The file menu includes several functions which have not yet been discussed. The save tree function allows retention of a decision tree on a non-volatile memory such as a disk. When this function is selected, the function menu window is cleared and a blinking cursor appears. A file name is assigned by the operator to the decision tree to be saved by typing the name at the cursor and depressing the return key. The tree is then entered on the disk for later use. The save subtree function performs a similar task for a portion of a tree. It is required in this case to identify the subtree by pointing at its root node.

The delete file function permits deletion of a tree or subtree previously entered onto the disk. The exit function in any of the function menus results in termination of the process. The eval menu function calls up the evaluation menu which will be discussed subsequently.

Other functions in the edit menu include the add subtree function. This permits the addition of a previously saved subtree to the present decision tree. In this case it is necessary to point at the root node location for the subtree. After pointing at the root node location, and entering the add subtree function the operator is prompted to enter the file name of the desired subtree. The subtree then is added with the display centered at the root node for the subtree.

The copy subtree function permits copying an existing subtree in the current tree to another point in the tree. It is particularly helpful when the same subtree structure will appear at several places within the tree. The subtree to be copied is first pointed, then the copy subtree function entered, and finally the operator is prompted to point the location of the root node to which the subtree is to be added. The subtree then is copied to this new location. Using a similar procedure, the delete subtree function permits deletion of an unwanted portion of a tree.

Finally, the edit values function permits modification of values in the tree. When this function is invoked, the operator is first prompted to point to the node where changes are to be made. A menu of the values that can be changed then appears, and after entry of the new values, the tree is so modified.

Once a tree has been loaded from memory by means of the load tree function, or a tree has been completed by means of the edit menu operations, the operator will wish to evaluate the tree. The eval menu can be called up from either the file menu or the edit menu. The functions available in this menu are shown in Table 3.

TABLE 3

| Eval Menu | |
| --- | --- |
| Selected Value | Exit |
| Prob Dist | Edit Menu |
| Edit Values | File Menu |
| Macro View | |

The expected value function performs the classical decision tree evaluation or "rollback" to determine the expected value of the decision. When expected value is selected, a menu with the options "maximize" or "minimize" appears. The appropriate one of these is selected in dependence on whether the tree has been set in terms of profits or costs. The best decision at each decision node of the tree is then indicated by highlighting the branch corresponding to that decision. Also, at each decision node the expected value for the decision is shown. In the tree of FIG. 3, the expected value that would be shown with BRANCH 1 is $14,600, while the value for BRANCH 2 is $14,100. As a result, BRANCH 1 would be highlighted as the best choice.

Figure 7:
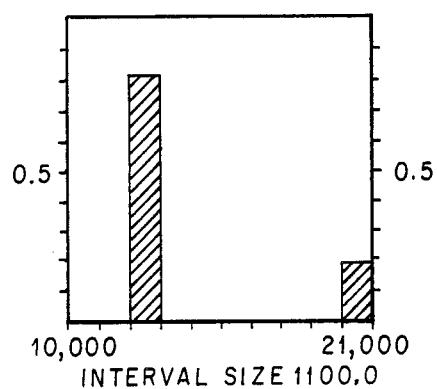
FIG. 7 shows the display of a probability distribution.

Once the expected value analysis has been completed, the prob dist function can be used to examine the distribution of discrete outcomes of a decision. The prob dist function may be invoked at any point in the tree, and includes all individual outcomes which may occur assuming that the best alternative is selected at each decision point. When this function is selected, it is first necessary to point at the node for which the probability distribution is desired. The operator then selects from a menu containing the choices of cumulative or non-cumulative distribution. The operator is also permitted to specify the number of intervals that will appear in the display, the default number being ten. FIG. 7 shows the non-cumulative distribution for the root node of the tree shown in FIG. 3. This display appears in function display window 34. While this distribution could be obtained by inspection of the tree, such is not the case in the practical case where complex tree structures are involved.

The foregoing has been a functional description of the process. The following provides a detailed description of the details of the system which accomplishes this process.

DETAILED DESCRIPTION OF THE SYSTEM

Implementation of the system relies on the concept of a node data structure, that is a list of information for each node in the tree. The information includes data about the node itself and relates the node to other nodes in the tree structure. Table 4 summarizes the information that appears in the node data structure.

TABLE 4
---
Node Data Structure

Node Number
Node type (decision chance, end?)
Annotation related to the node
Probability if the parent node of this node is a chance node
Value in the case of an end node
Identity of the parent node to this node
Information for identifying successor nodes to this node
---

The method provided by the invention comprises the sequential execution of various functions such as load tree, define node, add branch, each of which uses the information in the node data structures. Selection of a particular function from any menu that is displayed during use of the system is accomplished by means of an interface for menu point selection. Such interfaces are well known and require no further description here. With reference first to the file menu, when the load tree function is selected, a menu showing the names of the existing tree structure menus is displayed. The operator then selects one of these to activate loading of the tree. The system them acquires each of the node data structures from the disk memory for this tree and enters them into fast access memory within the computer for subsequent use by the various functional routines. At this time, the root node of the tree is considered to be the focus node and the portion of the tree including the root is displayed.

Figure 8A:
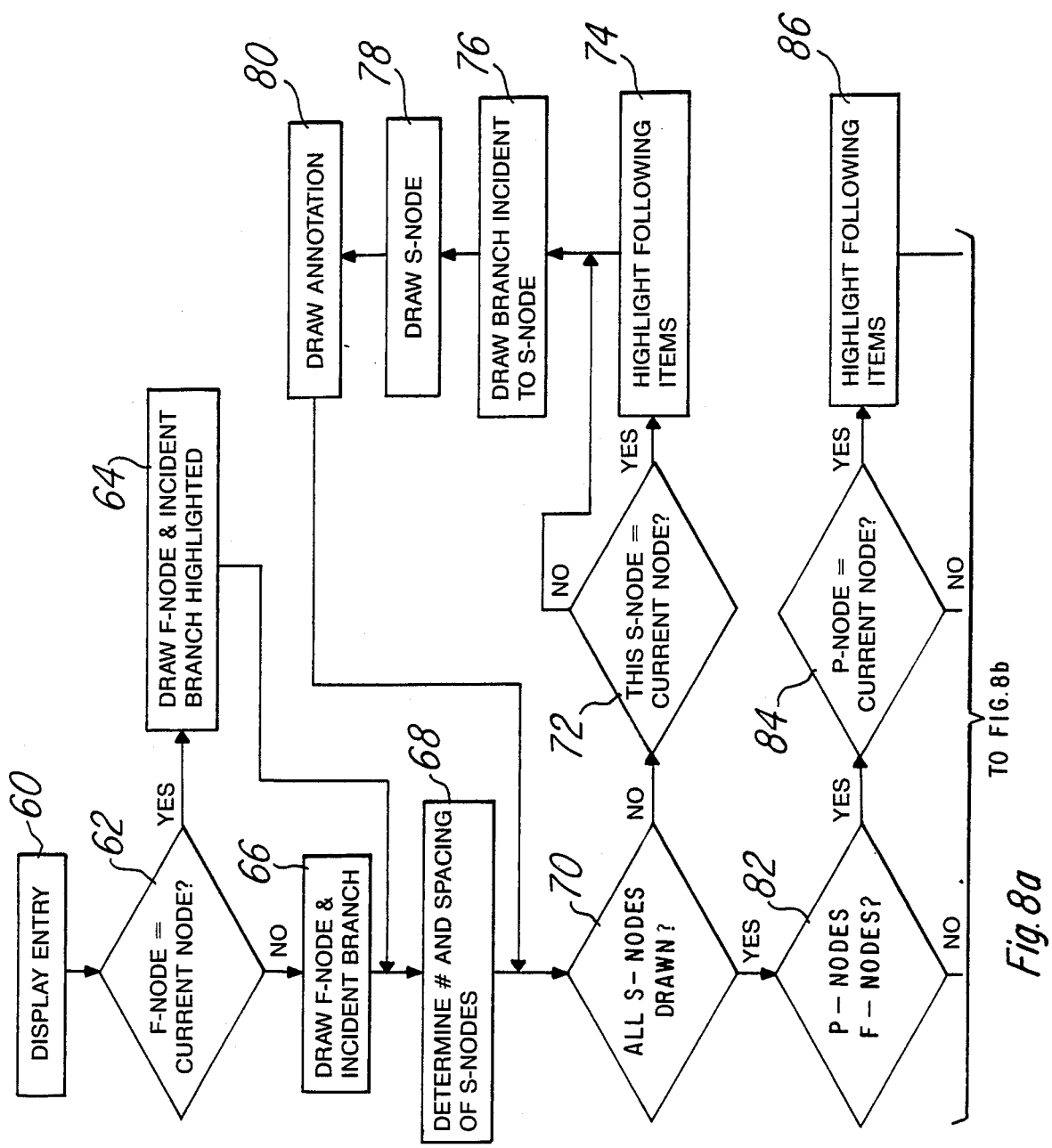
FIG. 8 is a flow chart for the display function.
Figure 8B:
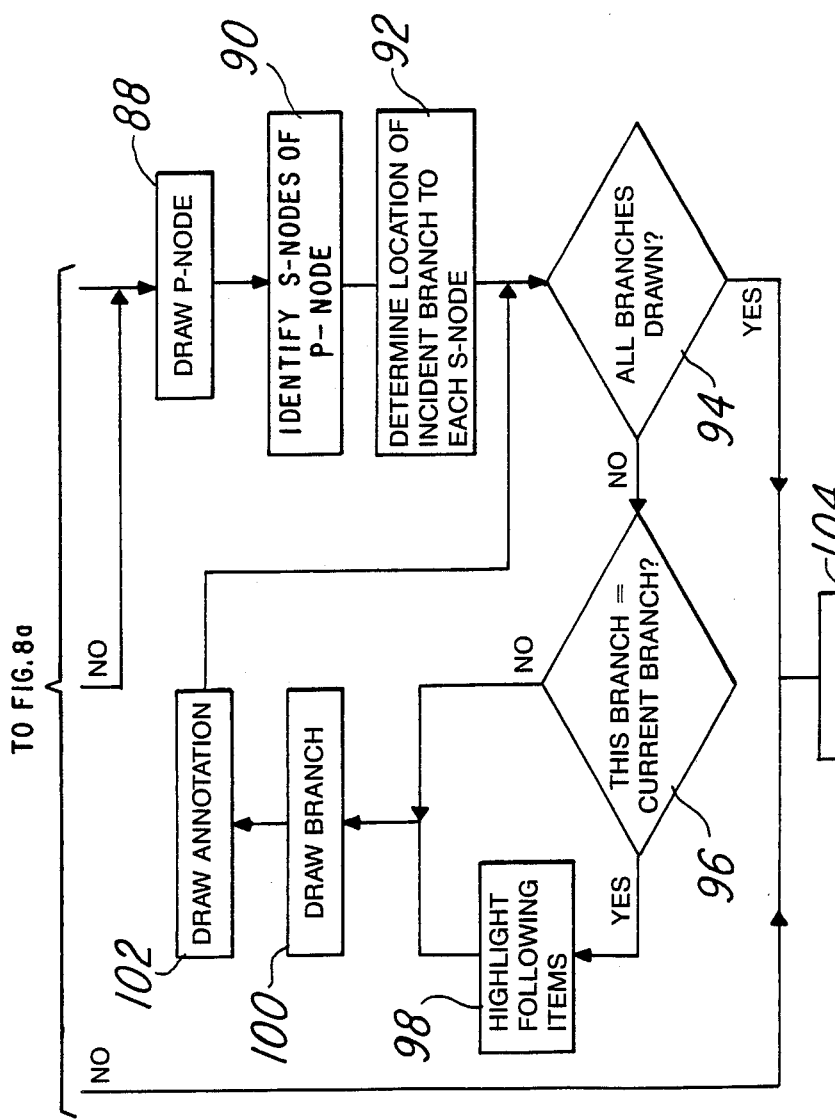

FIG. 8 shows a flow diagram of the display routine that is employed each time the display is to be changed during use of the system. The routine is entered at block 60. At test block 62 the identities of the focus node and current node are compared and if there is equivalence, then the focus node along with its incident branch are drawn in highlighted form (processing block 64). If there is no equivalence, then the focus node and its incident branch are drawn in normal form at processing block 66. The "current node" is the node that has been selected by the operator to be the locus of some current operation in implementation of a function. For example, in an add branch operation the operator would have designated the node to which the new branch is to be added, and the node at the end of this new branch becomes the current node. As noted above, in the case of a load tree operation, the root node is automatically designated as the focus node.

At processing block 68 the number and spacing of the successor nodes to the focus node is determined. If there is an odd number of successor nodes, the center node of this group will be displayed on the same line as the focus node and half of the remaining nodes will be shown above this line with the other half appearing below this line. If there is an even number of successor nodes half will be displayed above and the other half below the line having the focus node.

If one of the successor nodes has not yet been displayed at test blocki 70, test 72 block determines whether this node is the current node. If not, this node, its incident branch, and any annotation associated with the node is displayed in normal form at blocks 76, 78, and 80. If, however, this node is the current node, then processing block 74 causes this portion of the display to be shown in highlighted form. Generating the display of the successor nodes continues until test block 70 determines that all of the successor nodes have been drawn.

At test block 82 the focus node is checked to see if it has a parent node, and if so test block 84 is to determine if this parent node is the current node. If not proeecessing block 88 draws the parent node in normal form, whereas in cases when the parent node is the current node, processing block causes the parent node to be drawn in highlighted form. Next the successor nodes to the parent node are determined at processing block 90 and processing block 92 identifies which of these are to be displayed above and which below the line containing the focus node and its parent node. At test block 94 the test determines whether all branches emanating from the parent node have been drawn. If a branch remains to be drawn, it is compared to the current branch at test block 96 and the branch with its annotation is drawn in normal or highlighted form at processing blocks 98, 100, and 102 in conformance to the result of the test. Note that the successor nodes to the parent of the focus node are not shown in this preferred embodiment of the invention. When all of these branches have been drawn, the routine is exited at return block 104. If at test block 82 it is found that there is no parent node to the focus node, the routine is also exited immediately at that point.

Figure 9:
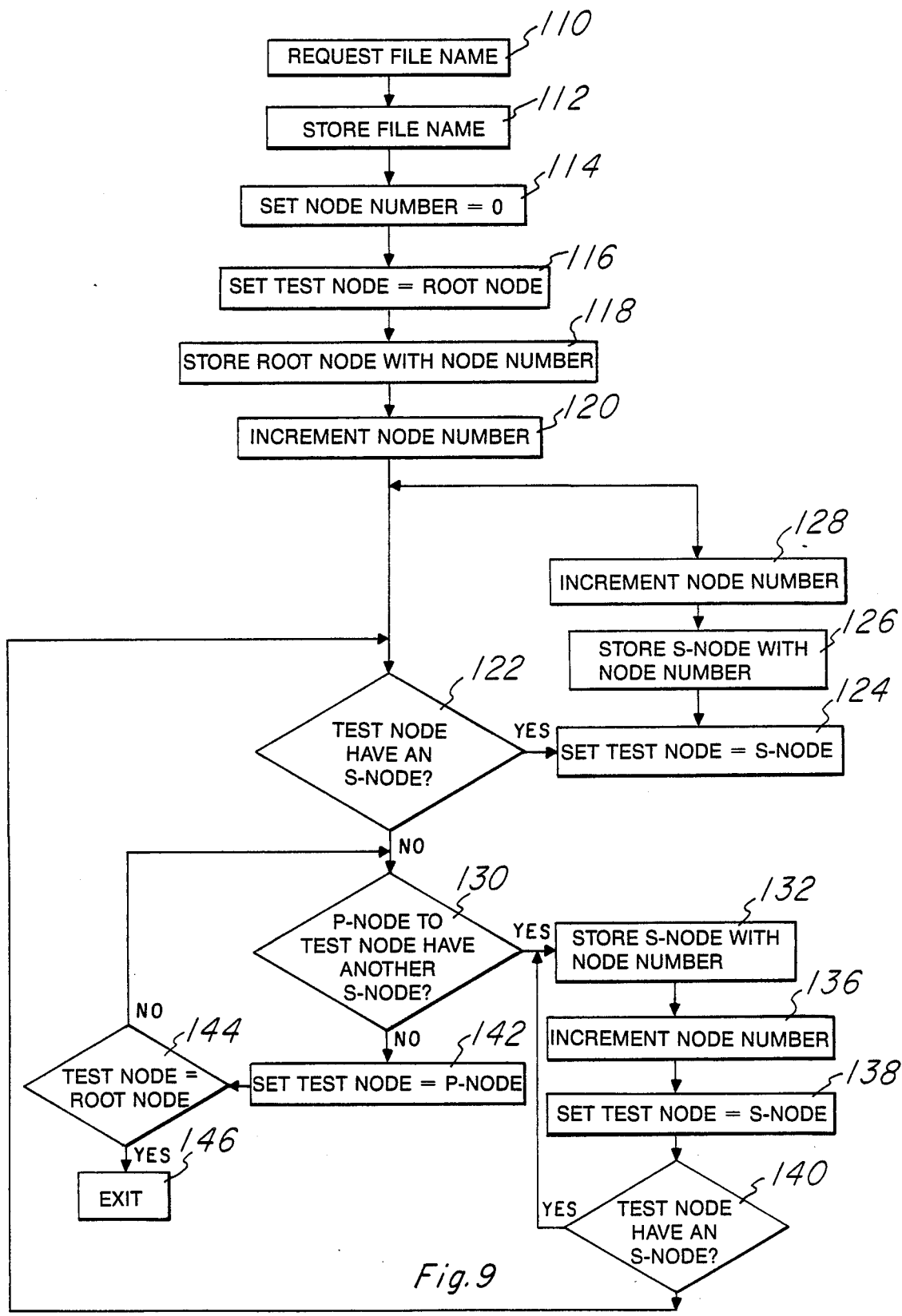
FIG 9 is a flow chart for the store tree function.

Retuning to the routines in the file menu, FIG. 9 shows the flow for the save tree routine. At processing block 110 the operator is requested to enter the file name that he wishes to assign to this tree. This file name is then entered into the non-volatile memory of the disk at processing block 112 and a variable "node number" is initialized to a value of zero at processing block 114. Similarly, the variable "test node" is set equal to the identity of the root node of the tree at block 116. The root node is then assigned a number equal to the current value of node number and stored on the disk as indicated at block 118. At block 120, the current value of node number is incremented by one. Test 122 determines whether the current test node (the root node at this point in the process) has at least one successor node. If so, the value of test node is set equal to the identity of this successor node at block 124. The data structure of this successor node is stored on disk with the current value of node number at block 126, and the value of node number is incremented once more at block 128. This loop continues until an end node is encounteed in the tree at which time test 122 fails and the flow passes to test block 130. The order in which successor nodes are considered at test block 122 is from top to bottom, that is, when a successor is sought for a test node, the successor node that appears nearest the top of the tree structure as it is displayed will be considered and stored first.

Once an end node is encountered, the value of test node at that point will be the identity of such end node. This value is tested at test block 130 to determine wheter the parent node to this end node has any other successor nodes (that is whether the end node had any siblings). If so, this new successor node is assigned the most recently incremented value of node number and its data structure is stored on the disk at block 132. The node number is incremented at block 136, and test node is set to the identity of this new successor node at block 138. At test block 140 successors to the new test node are sought and the inner loop comprised of blocks 132–140 continues until a new end node is encountered. When this occurs, flow returns to test block 130 to identify any siblings to the branch leading to most recently identified end mode. The data structure of the nodes at the end of such sibling branches are stored by the above referenced inner loop until there are no more siblings, at which time test 130 fails. The value of test node is then set to the identity of this parent node at block 142 and tested for equivalence to the root node at test block 144. If there is no equivalence, the entire loop structure beginning with test block 130 continues until ultimately test block 144 is satisfied. At this point the entire tree has been stored on the disk and the routine is exited at block 146.

A similar routine is used to save a subtree onto the disk, the only difference being that the routine starts with the node at the location in the tree designated by the operator rather than the root node as in the case of the save tree function.

Figure 10:
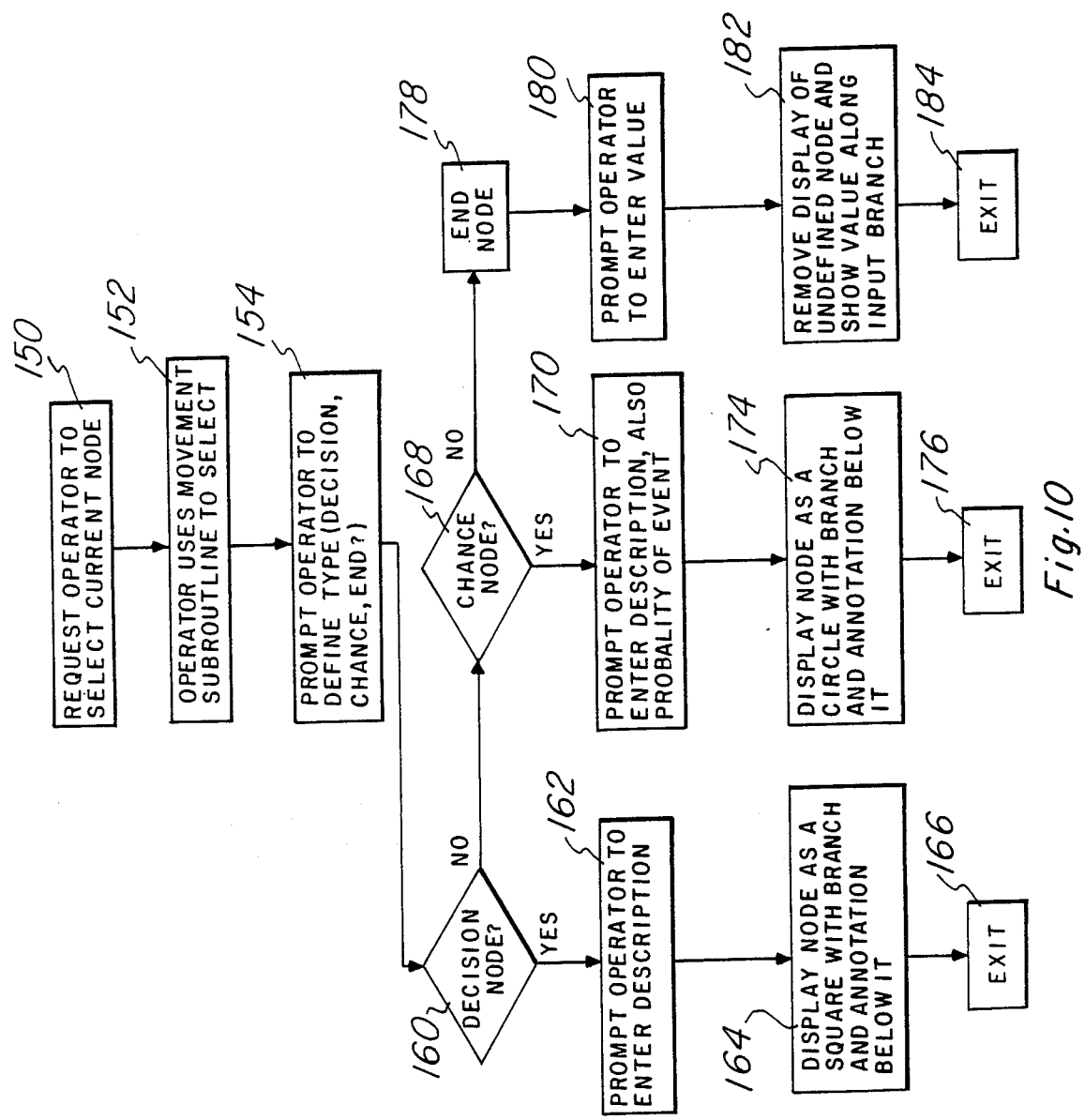
FIG. 10 is a flow chart for the define node function.

Turning next to the functions in the edit menu, it may be that the operator wishes to work with a previously established tree. In this case he will always have loaded this tree from the disk by means of the previously discussed load tree function. Alternatively he may wish to develop a new tree in which case he will begin with the new tree function. This function begins by displaying the root node with an incident branch for which annotation may be selected by the operator. There is also displayed a branch leaving the root node and an undefined node at the end of this branch, that is, a first successor node to the root node. Normally, the next step is to define this node by means of the define node function which will be described in connection with FIG. 10.

The operator is first requested to point to the current node which is to be defined (block) 150. Using the movement routine, which will be described below, the operator selects this node at block 152. At block 154, the operator is requested to identify the node as a decision, chance, or end node. The node type is tested at text block 160 to determine if the operator has identified the node as a decision node. If so, he is promoted to enter a description of one of the decisions that can be made at this point (such as stock, bond, annuity, etc.) if the decision is to be made is a choice of investment vehicles (block 162). The routine then causes the node to be displayed as a square with a branch below it (block 166). The description entered by the operator appears along this branch.

If the block 160 shows failure, the operator's choice is then tested at block 168 to see if this node is a chance node. If so, the operator is prompted to enter a possible outcome of the event represented by this node and also what he believes to be the probability of that outcome (block 170). The node is then displayed at block 174 as a circle with a branch and the associated description and probability below it.

Finally, if test block 168 fails, the node by default is an end node (block 178). At block 180, the operator is prompted to enter a cost or gain associated with the path through the tree leading to the final outcome represented by this node. At block 182, the combination of an open square and circle which represented the undefined node is removed, and the value selected by the operator is displayed along the branch leaving the chance node. In either of the three cases, after the display has been updated, the routine is exited as shown at blocks 166, 176, and 184.

Figure 11A:
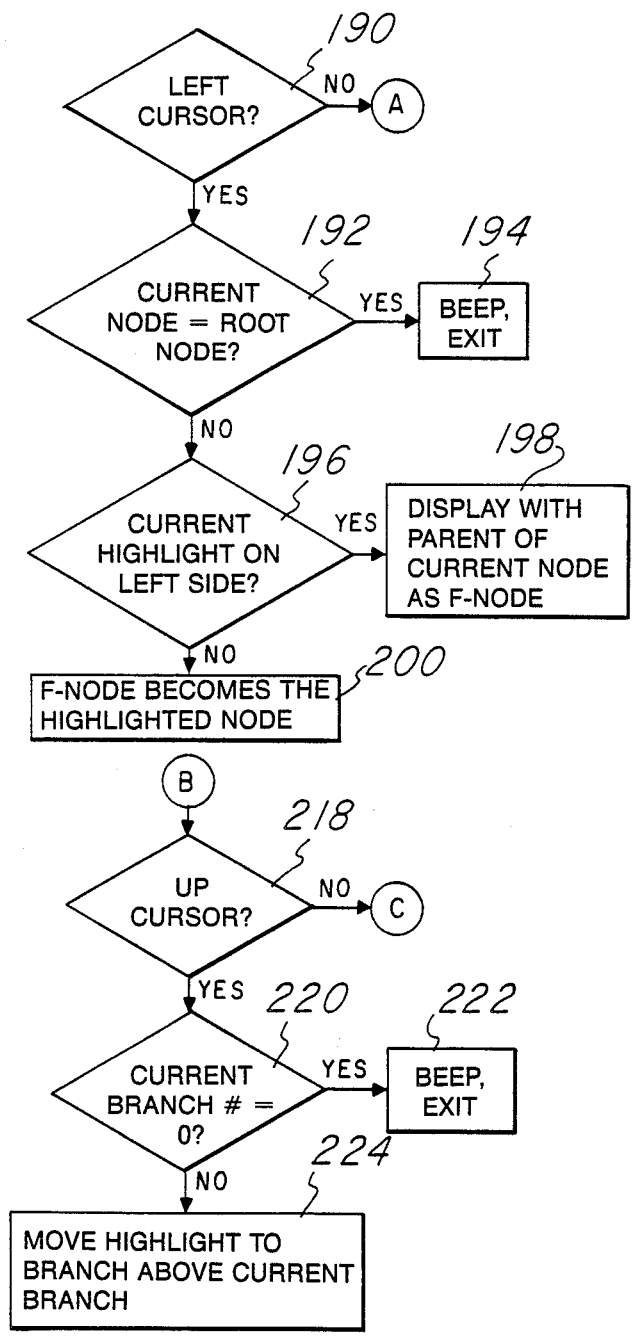
Figure 11A:
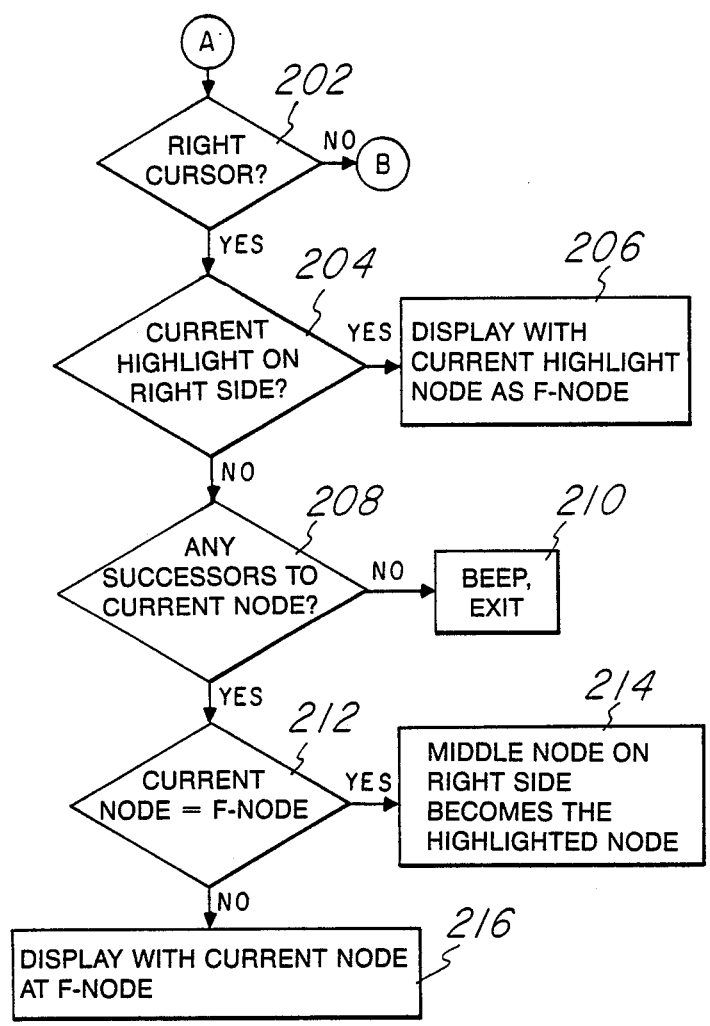
Figure 11B:
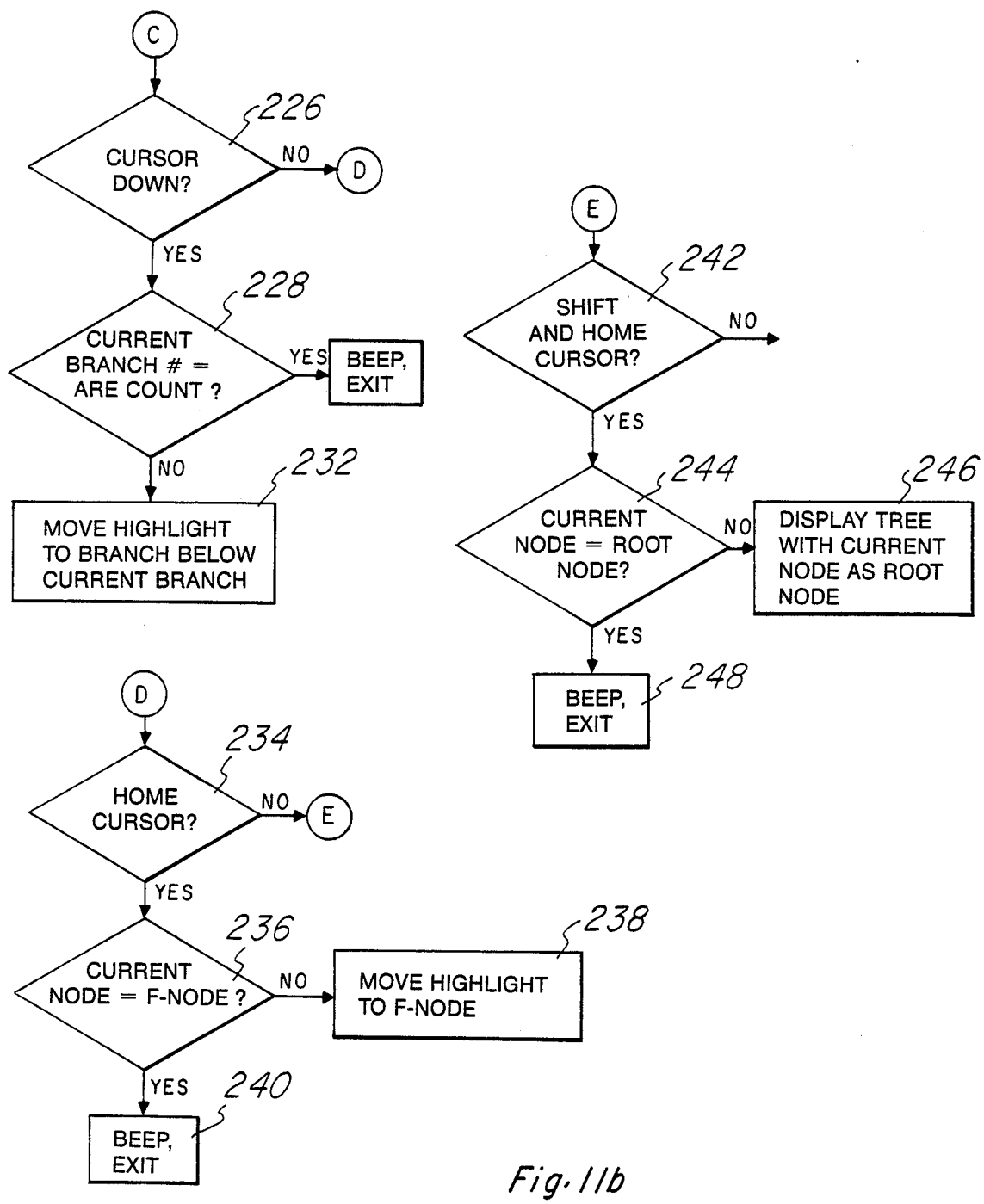

The routines for movement about the tree in response to the cursor keys are illustrated in FIGS. 11a and 11b. By movement in the tree is meant changing the location of the highlighted branch and node to vary the locus at which some operation is to be performed. As noted previously, the highlighted node and branch are referred to herein as the current node and branch. In this connection, two tables are maintained in active memory representing the two columns of branches that appear on the display at any point in time. Recall that the display contains a focus node, its parent node and the branch connecting the parent node to the focus node, and a successor node to the focus node along with the branch connecting the focus node to the successor node. In addition the display contains all sibling branches to the branch leaving the parent node and all sibling branches to the branch leading to the successor node. Accordingly, there will appear a column of one or more branches on the left half of the graphical display window and a column of one or more branches on the right half of this window. If there are N branches in the left half, the table for the left half of the window contains N items numbered 0 through $N-1$. If the right half of the window contains M branches the right hand table will have items numbered 0 through $M-1$. The memory contains the designation of which of the $M+N$ branches is the highlighted or current branch. Similarly the memory contains the identity of the current node and focus node.

Turning now to FIG. 11a, when a cursor key is depressed a test is first performed to determine if it was the left cursor (test block 190). If it was, test block 192 determines whether the current node prior to the key depression was the root node. If so there is no node to the left to move and the system provides an audible beep and exits the routine (block 194). Otherwise, the highlighted branch is checked at test block 196 to see if it is in the left hand column of branches indicating that the operator wishes to move to a node at the left side of the display. If so, the display is redrawn with the parent of the current node as the focus node and highlighted. Alternatively the current highlighted branch is on the right side of the screen and the current focus node becomes the highlighted node.

If the depressed cursor was not the left cursor, test block 202 determines if it was the right cursor. If so, test block 204 determines if the current highlighted branch is on the right side. If so, the display is redrawn with the current highlighted node as the focus node (block 206). If the current highlighted branch is on the left side, then test block 208 determines if there are any successors to the current node. If not, the block 210 causes the beep and exit. If there are successors, the current node is checked for equivalence to the focus node at test block 212. If so, the highlight is moved to the middle node on the right side (block 214). If not, the display is drawn with the current node as the focus node.

If the test 202 for right cursor fails, a test is performed for up cursor at block 218. If this test is positive, the current branch is checked to determine if it is number zero in the table of branches at block 220. If so, it is the top branch in the column of branches and it is not possible to move up in the tree at this point—hence a beep and exit at block 222. If the branch is not numbered zero, then the highlight is moved to the branch above the current branch.

Now turning to FIG. 11b, if the up cursor test fails, a down cursor test is performed at block 226. If this is true, the current branch number is tested at block 228 to determine if it is equal to the arc count, that is the value $N-1$, or $M-1$ in the table of branches depending on which column the current branch is located in. If it does have one of these values, that means that the current branch is the lowest one in the particular column and downward movement is not possible, hence the beep and exit at block 230. If the current branch is not the lowest in its column, then the highlight is moved to the branch just below the current branch (block 232).

If the down cursor test fails, two possibilities remain. At block 234, a check is made to see if the depressed cursor was the home cursor (see FIG. 1a). If so it is desired that the highlight move to the focus node. If the focus node is not already highlighted (test block 236) the highlight is moved to the focus node. If, however, the focus node was already highlighted, block 240 causes the beep and exit.

Finally, if the home test fails, test block 242 checks to determine if the shift and then home cursor keys have been depressed. If so, it is desired that the root become the current node. If this test passes, test block 244 determines if the tree already has the root as the focus node. If not the display is redrawn with the highlight located at the focus node (block 246). Otherwise block 248 causes the beep and exit.

Figure 12:
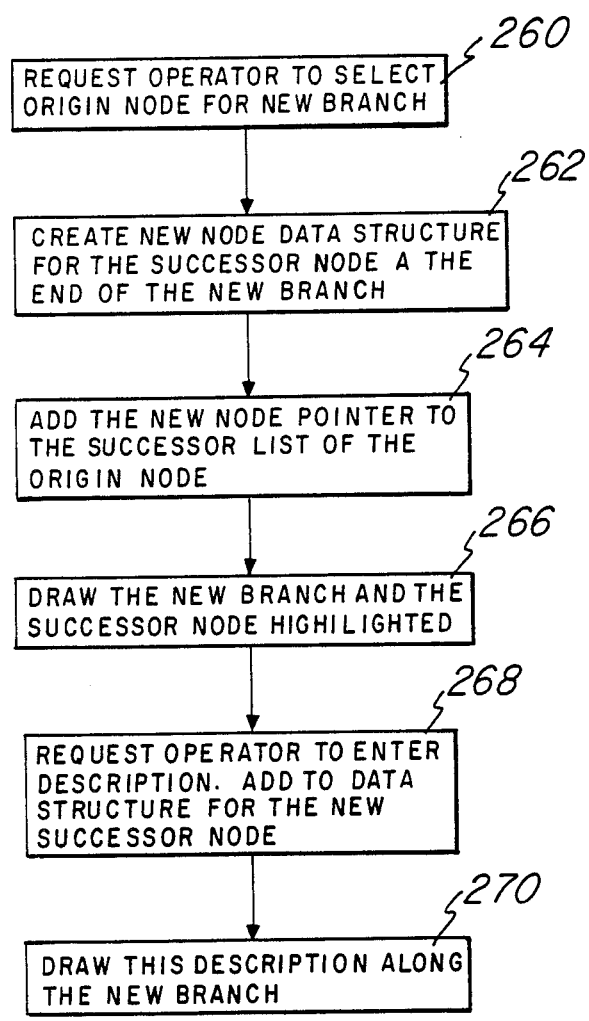
FIG. 12 is a flow chart for the add branch function.

The add branch function is illustrated in FIG. 12. At block 260, the operator is requested to point at the origin node for the branch which is to be added. In response, at block 262 a new node data structure is set up for the node to be added at the end of the new branch. A pointer to this new node is added to the list of successor nodes of the origin node of the new branch (block 264). The new branch and the new successor node are then drawn highlighted at block 266. At block 268, the operator is requested to specify a description for the new branch, and this annotation information is added to the data structure of the new successor node. Finally, at block 270 the annotation is printed along the new branch in the display.

Figure 13:
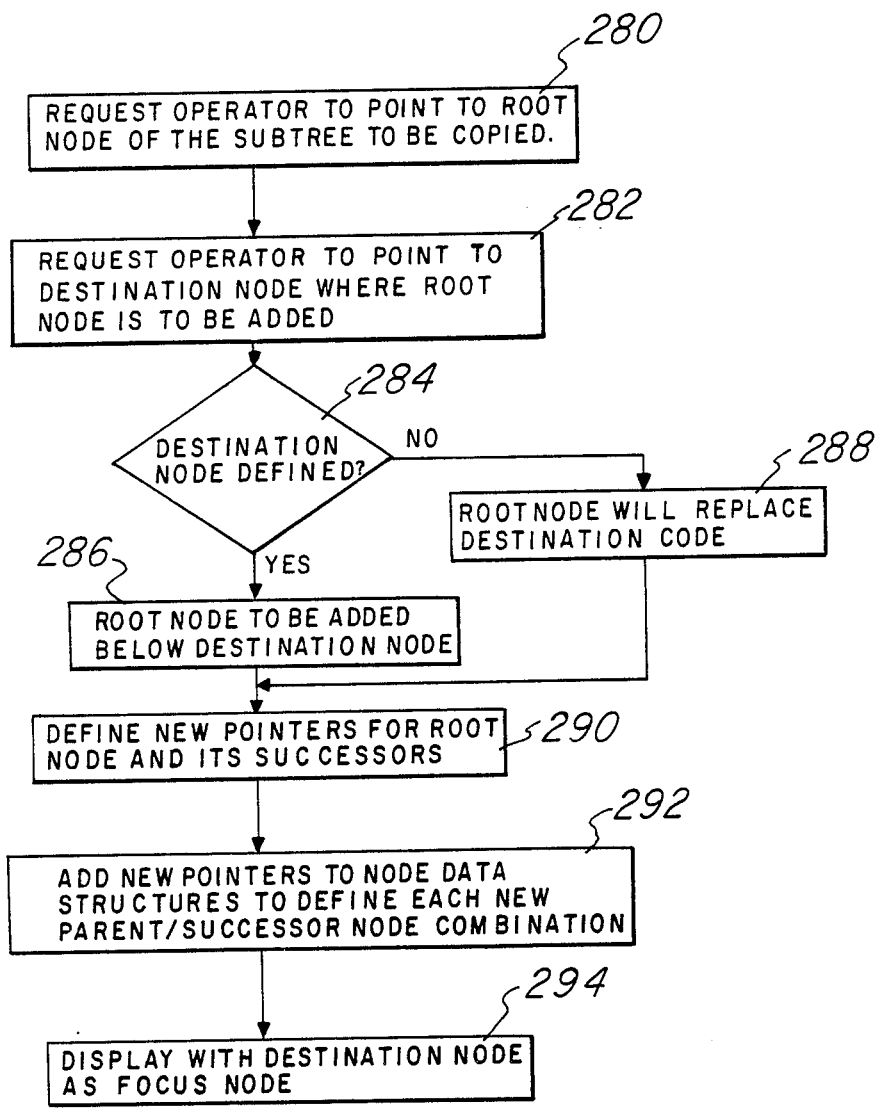
FIG. 13 is a flow chart for the copy subtree function.

As described previously, the copy subtree permits identifying a subtree which has been constructed at one point in a tree and locating a duplicate of the subtree at another point in the tree. With reference to FIG. 13, the operator is first requested to identify both the root node which is the node at the base of the subtree, and also the destination node where the base of the copy of the subtree is to be located (blocks 280 and 282). This destination node may or may not be a defined node as is tested at test block 284. If the destination node is a defined node, then the root node of the subtree will be added below the destination node as shown at block 286. Alternatively, if the destination node is not a defined node, then it will be replaced by the root node (block 288). In either case new pointers are defined for the root node and its successors throughout the subtree copy at block 290. Then new parent and successor pointers are added to the node data structures as required to define each new parent/successor node combination formed by the act of copying the subtree at block 292. Finally, at block 294 the display is generated with the destination as the focus node.

The new subtree function is similar except for the fact that the subtree to be copied is accessed from the disk memory as opposed to coming from elsewhere in the existing tree. The delete subtree function simply requires the operator to point to the root node of the subtree that is to be deleted. Node data structures corresponding to nodes in the subtree to be deleted are simply deleted from the tree memory, as are references to any of these nodes in the data structures of other nodes in the tree.

Figure 14:
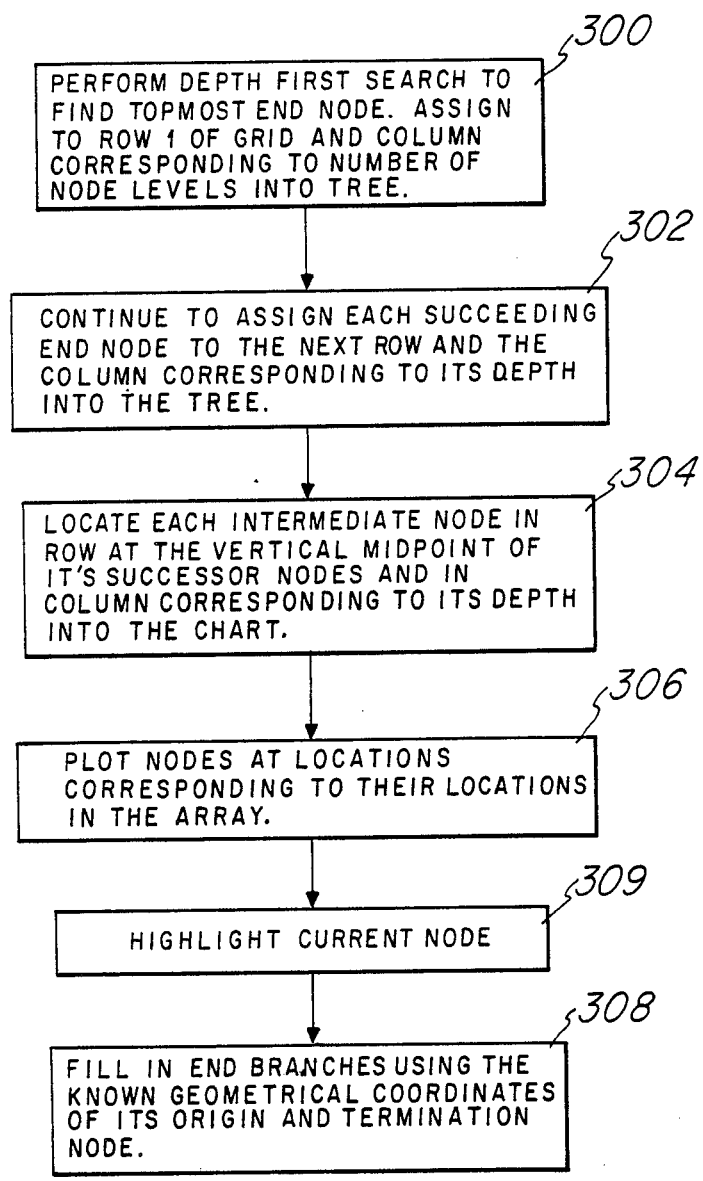
FIG. 14 is a flow chart for the macro view function.

A flow chart for the macro view function appears in FIG. 14. A two-dimensional array is maintained in memory with a location corresponding to each point in function display memory 34 where a node can be represented. The task of setting up this array in preparation for displaying the macro view involves identifying each node in the tree and assigning it to the appropriate one of these array locations. Once this has been done the branches connecting the nodes can be inserted from geometric considerations and the display plotted. Assignment of the nodes begins at block 300 where a depth first search is performed to find the first end node at the top portion of the tree. A similar depth first search is implemented by the portion of FIG. 9 comprising blocks 116 through 128. Once the topmost end node has been identified, it is assigned to a location in the first row of the two dimensional array, and in the column corresponding to the depth of the end point into the tree. For example, if the end node was the successor of a node whose parent was the root node of the tree, then the end node would be located in the third column of the array. Consequently, that end node would be displayed in the (1,3) location of the macro view display. At block 302, this process is continued with each new end node being assigned to the row just below that of the preceding end node and to a column corresponding to its depth into the tree. At block 304, each intermediate node is assigned to a column corresponding to its depth into the tree. The set of rows at which its set of immediate successor nodes is determined, and the intermediate node assigned to a row at the middle of this set. At block 306, the set of nodes is plotted in function display window 34 at locations corresponding to the locations of the nodes in the two-dimensional array. At block 309, the node in the macro view corresponding to the highlighted node in the focused view is also highlighted. Then at block 308, the branches connecting the nodes are inserted using the known geometrical coordinates of the origin and termination node.

Movement of the highlighted node in the focused view has been discussed previously. The location of the highlighted branch can be caused to move in the macro view in the same way. When this is done, upon return to perform a function on the focused view, the highlighted node will be the same as then appears in the macro view. Thus, movement of the highlighted node in either view results in similar movement in the other view.

In the edit value function, the operator is enabled to select the type of value that is to be changed, and then points at the location where the change is to be made. He then enters the new value to accomplish the change. The detailed description of these steps corresponds to portions of flow graphs already discussed.

Turning to the eval menu, the expected value and probability distribution functions implement well known statistical concepts. In the case of the expected value function, the basic concept is the idea of expected value at a node. If the node is a chance node having two possible outcomes with probabilities A and B, and respective economic effects M and N, then the expected value is defined as follows.

Expected value $= (A \times M) + (B \times N)$.

In other words it is the average profit (or cost) if the chance event were performed a sufficient number of times for the average result to approach the true mean value of the probability distribution of the event. The expected value so calculated then becomes the economic effect or value for the immediately preceding node in the tree. The expected value for an end node is defined here to be the value that was assigned to that node by the operator. Finally, the expected value for a decision node is defined to be larger in the case of profit analysis (smaller in the case of cost analysis) of the expected values for the successor nodes to the decision node. In other words the analysis assumes that the decision maker would make the correct decision at each decision node in the tree. Using these definitions than the analysis is simply marched back through the tree from the end nodes to the node at which the answer is desired. This is normally the root node, but it will be readily understood that a by product will be the expected value at every node of the tree. When a portion of the tree is displayed after this analysis, the annotation for the best value at each step in the tree is highlighted.

At any chance node in the tree, two or more results will be possible, each having the probability assigned by the operator during construction of the tree. Once the expected value analysis has been performed, the economic effect of each of these chance events is known. It is then a routine matter to generate a display such as that shown in FIG. 7 giving the value of these economic effects as a function of their probabilities. This type of display can be generated for any node in the tree, the root node being chosen most commonly. Also, as is well known, the display may be either of the cumulative or non-cumulative distribution for the node.

Although specific embodiments of the preferred form of the present invention have been described herein, it will be evident to those skilled in the art that the invention finds utility in connection with the development of other tree structures. Some other tree structures for example, but not by way of limitation, include pert charts and knowledge representations for expert systems. Other variations may be made in the construction, arrangement or operation of the parts or elements of the various embodiments as disclosed herein without departing from the spirit and scope of the invention as defined in the following claims.

What is claimed is:

1. A method for providing a display of a tree structure which includes a plurality of nodes interconnected by tree branches, said method comprising the steps of:
   (a) selecting a portion of said tree structure to be displayed,
   (b) scaling the geometry of said portion in a manner different than that which would be used if the entire tree were to be displayed, and
   (c) displaying the scaled portion on a medium suitable for interpretation.

2. The method of claim 1 wherein said geometry is scaled to provide that the density of tree branches is approximately uniform throughout the displayed portion of said tree structure.

3. The method of claim 1 wherein the displayed portion includes a focus node, the set of branches that originate at said focus node, the incident branch leading to said focus node, and the siblings of said incident branch.

4. The method of claim 1 wherein a second display of more of said tree structure is provided in addition to the display of said scaled portion.

5. The method of claim 1 wherein the display medium is a cathode ray tube.

6. The method of claim 1 wherein said display further includes annotation associated with said nodes.

7. An interactive method for providing a display of a portion of a tree structure which includes a plurality of nodes interconnected by tree branches, said method comprising the steps of:
   (a) promoting an operator to select a focus node for the tree portion to be displayed,
   (b) identifying an output branch which originates at said focus node,
   (c) identifying an incident branch leading to said focus node,
   (d) identifying the siblings of each of said output and incident branches, and
   (e) displaying said focus node, output, incident and sibling branches in a geometry scaled differently than that which would be used if the entire tree were to be displayed.

8. The method of claim 7 wherein the geometry is scaled to provide that the density of tree branches is approximately uniform throughout the displayed portion of said tree structure.

9. The method of claim 7 wherein a second macro display is also provided comprising a greater portion of said tree structure than that included in the first display.

10. The method of claim 7 wherein said display further includes annotation associated with said focus node.

11. An interactive method for creating a tree structure and providing a display of a portion thereof wherein said tree structure includes a plurality of nodes interconnected by tree branches, said method comprising the steps of:
   (a) prompting an operator to define the nature of the various nodes of said tree structure,
   (b) prompting an operator to add branches to connect said nodes,
   (c) displaying a portion of said tree structure as it is created, said portion being scaled to have a geometry different than that which would be used if the entire tree structure were to be displayed.

12. The method of claim 11 wherein said operator is further prompted to select annotation associated with said nodes and branches.

13. The method of claim 11 wherein the displayed portion includes a focus node, an output branch which originates at said focus node, an incident branch leading to said focus node, and the siblings of said output and incident branches.

14. The method of claim 11 wherein said geometry is scaled to provide that the density of tree branches is approximately uniform throughout the displayed portion of said tree structure.

15. The method of claim 11 wherein a second macro display is also provided comprising a greater portion of said tree structure than that included in the first display.

16. The method of claim 11 wherein said operator has the option of selecting a subtree from said tree structure and duplicating said subtree elsewhere in said tree structure.

17. The method of claim 12 wherein said tree structure comprises a decision tree, and wherein said operator is prompted to provide a values associated with various parts of said tree.

18. The method of claim 17 wherein said operator has the option of modifying said values.

19. The method of claim 17 wherein said display further includes an indication of the best decision at each decision point in said decision tree.

20. A method for displaying a tree structure comprising the steps of:
   (a) selecting various portions of the tree structure to be displayed, and
   (b) providing a display of each of said portions, each such display having a common geometry irrespective of the location and geometry of the corresponding portion in said tree structure.

21. The method of claim 20 further comprising the steps of:
   (a) prompting an operator to define nodes and branches of said tree structure,
   (b) adding the nodes and branches defined by said operator,
   (c) prompting said operator to select portions of said tree structure to be displayed, and
   (d) displaying said portions in said common geometry.

22. A method for displaying a tree structure comprising the steps of:
   (a) providing a first display of a portion of said tree structure, said portion containing at least two node, one of said nodes being highlighted,
   (b) providing a simultaneous second display of at least a part of said tree structure, said second display including the nodes contained in said first display, the node in said second display corresponding to the highlighted node in said first display also being highlighted, and the geometry of said first display being different than the geometry of the corresponding portion of said second display, and
   (c) providing means whereby an operator can cause the location of the highlighted node in either display to vary with a consequent corresponding movement of the same node in the other display.

* * * * *